Dec. 31, 1968    R. T. TOWNER    3,419,333
RUNWAY VISUAL RANGE COMPUTER SYSTEM
Filed Sept. 1, 1965    Sheet 1 of 2

INVENTOR
ROBERT T. TOWNER
BY Browne, Schuyler & Beveridge
ATTORNEYS

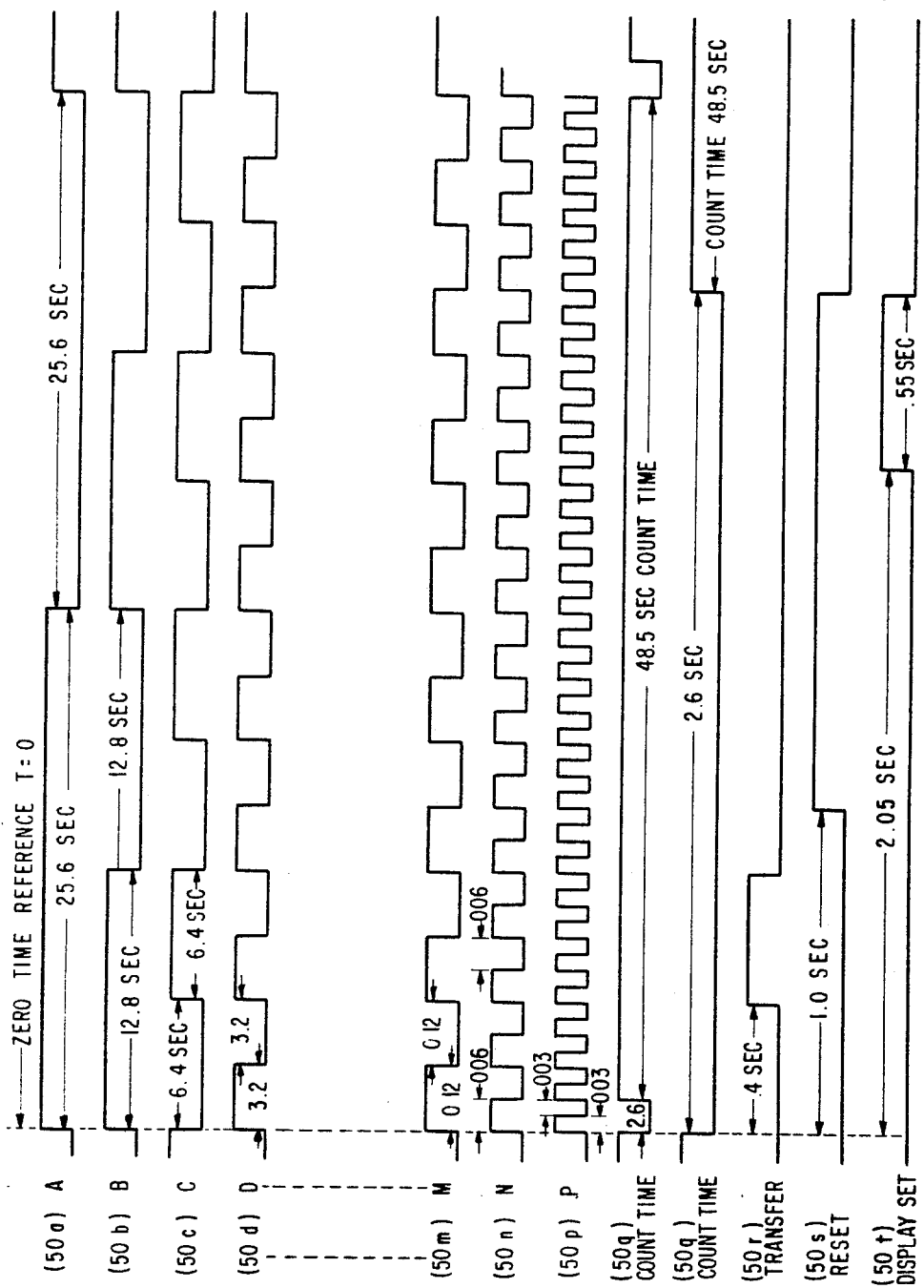

United States Patent Office 3,419,333
Patented Dec. 31, 1968

3,419,333
RUNWAY VISUAL RANGE COMPUTER SYSTEM
Robert T. Towner, Ellicott, Md., assignor to Industrial Research Associates, Inc., Baltimore, Md., a corporation of Maryland
Filed Sept. 1, 1965, Ser. No. 484,397
10 Claims. (Cl. 356—205)

ABSTRACT OF THE DISCLOSURE

This invention provides a visual range in hundreds of feet visibility for those conditions of runway illumination covered in tables for varying conditions by presenting a transmissivity measurement as a count of light received in a fixed interval of time less a background count in a like interval, with means comparing the count to a count range set out in a selected table of values stored for that condition. A visual range of like numerical value is obtained from widely differing ambient light measurements by selection for comparison therewith of that appropriate one of six standardized stored tables specified for use under specified lighting conditions.

---

Figure 1:
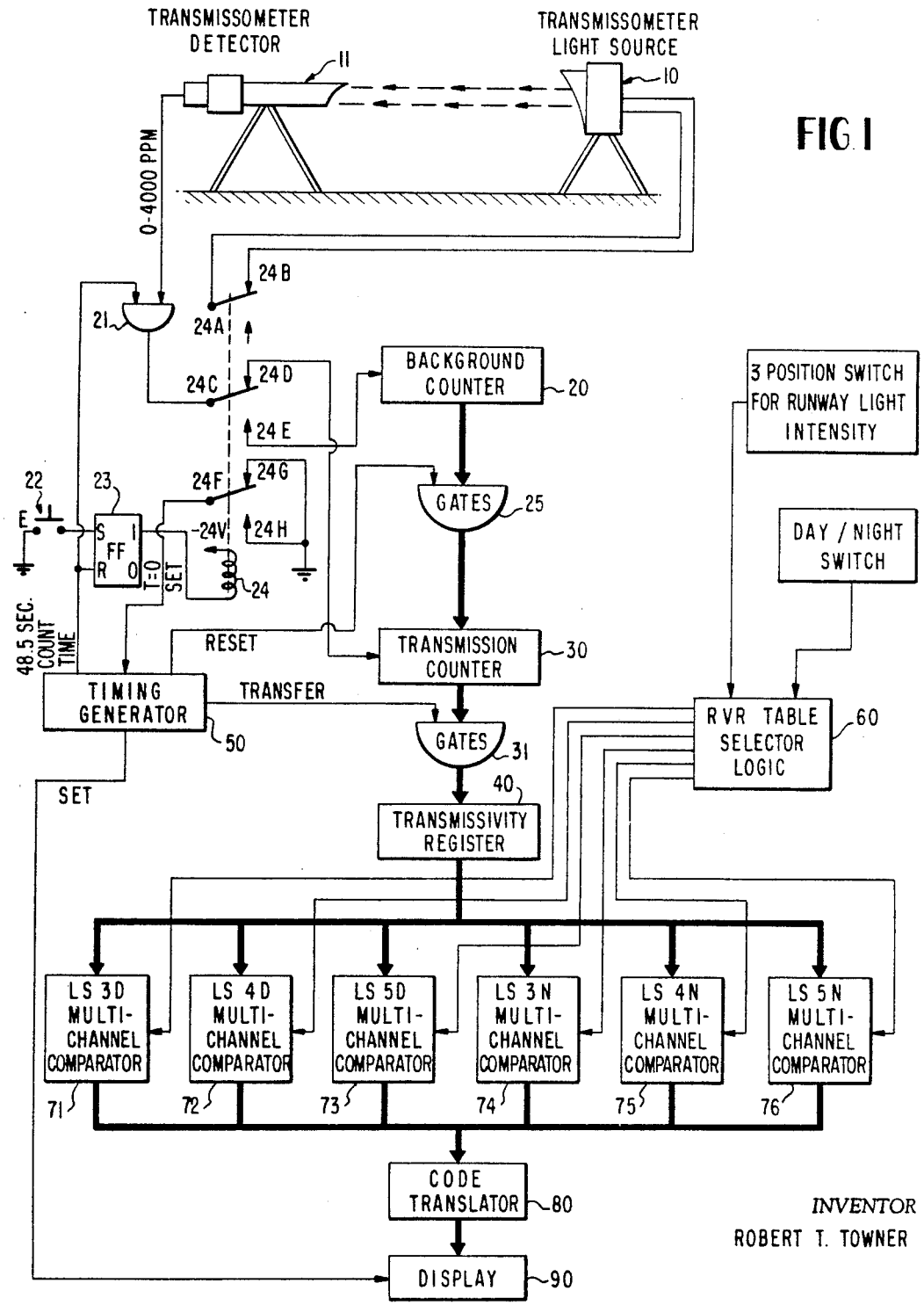

This invention relates generally to automatic means for determining the range of visibility along a path such as an airport runway, and more particularly to automatic computer means for converting atmospheric transmissivity as instantly measured into the appropriate one of a preselected number of visibility ranges to be read from the appropriate one of a number of tables of values stored within the computer each corresponding to a differently varying ambient condition.

It has previously been known to measure atmospheric transmissivity between two fixed points along a path wherein a light transmitter is operated at a known intensity and a receiver unit at a fixed distance therefrom receives that directly radiated portion of light which is not absorbed by the intervening atmosphere, the analog value of received light being converted to digital form. Apparatus of this kind has been referred to as a transmissometer generally including a light source, a receiver giving an analog voltage output, a counting device in or associated with the receiver which converts the analog signal into a series of equal energy pulses of frequency proportional to the signal received during an assigned interval such as the 48.5 sec. period hereinafter illustratively described. It has been generally convenient to provide pulses in the range from 0–4000 per minute for representing the full range of zero to perfect transmissivity. However, measurement of runway visual range, often abbreviated as "RVR," is desirably expressed in hundreds of feet visibility, where over 6000 feet is regarded as full visibility and less than 1000 feet is considered "socked in."

Such measurements require a known or standardized light source and a receiver of known or standardized sensitivity placed at a known distance such that the analog signal produced in the light receiver will have a standard or known relationship to the light actually produced in the transmitter under perfect conditions. Such apparatus is effecitve for measuring transmissivity under a particular condition where the transmitted light is of fixed value and has a fixed relationship to the ambient light. Both such factors are variable, however, and further refinement is necessary because the ambient light changes greatly from hour to hour during a 24 hour period and because differing conditions require differing runway light intensities for best vision by the pilot who is landing or taking off from such a runway. When the visibility figure to be measured is the visibility of the runway lights it is essential also to take into the calculation the brightness of these lights as well as the background against which they are to be seen. For these reasons, it has been necessary to determine visual range differently for a number of different circumstances involving these varying factors in addition to the transmissivity of the atmosphere between the transmitter and receiver for the test light. Relationships between transmissivity measurement and actual visual range have been worked out and adopted as standard according to six tables hereinafter more fully explained. Previously available apparatus for converting transmissivity data into RVR figures has been effective for one table but has not provided automatic transfer from one table to another without error as the conditions change between tests and during a test.

It is accordingly an object of this invention to provide a runway visual range indicating system providing automatic conversion of measured data into differing standardized output indications in accordance with tabular values selected for a number of differing lighting conditions.

Another object of the invention is to provide a runway visual range computer accepting transmitted pulses and converting the pulsing frequency to a standardized digital value corresponding to runway visual range under the indicated ambient light and runway lighting conditions then obtaining.

Another object is to provide computer storage for a plurality of tabular equivalents for converting a set of transmissivity data to a set of visibility data together with automatic means selecting the appropriate tabular equivalents for an ambient condition for conversion of transmissivity data into a digital output for the particular transmissivity measurement depending upon which of the ambient conditions is instantly effective.

A further object is to provide a visibility reading with minimum delay following the change in a test factor causing a change in relationship between a measured value and a visibility value.

A still further object is to provide automatic conversion of a signal detected as a pulse count in a time interval into an output digital representation which is one of a limited number of possible outputs differently depending upon the pulse count obtained in accordance with one of a number of factors not proportionately related to the pulse count.

These and other objects of the invention will be better understood as the description proceeds in connection with the drawings illustrating one mode of carrying out the invention in which:

FIG. 1 is a schematic view of a runway visual range computer system according to this invention; and FIG. 2 is a timing diagram for a time signal generator for controlling computer functions including the storage and readout of data from the system of FIG. 1.

In accomplishing the objectives of this invention, applicant provides a storage register for recording a background count and the transmissivity count from the transmissometer arranged to have the background count subtracted from each transmissivity measurement count, being changeable by switch means without loss of ability to provide an answer always within one counting interval. Automatic readout from the one appropriate table of six tables permanently stored in the computer is effected by comparing the difference count of each new interval with tabular values for each ambient condition from which output is automatically selected according to the condition then prevailing.

Timing signals and intervals and details of operation are selected for convenience and standardization purposes and may be varied according to the specific form of the apparatus, but will be hereinafter described in exemplary details to more clearly illustrate functional operation as in one suitable embodiment.

With reference to FIG. 1, light emitted from source 10 is received by a device generally referred to as a transmissometer detector 11 where it is converted to pulses having a repetition rate of 0–4000 pulses per minute to indicate measured transmissivity, but which includes background and stray light effects. Pulses from 11 are passed via gate 21 and contacts 24C of relay 24 to either a background counter 20 via 24E or a transmission counter 30 via normally closed contacts 24D. A background count is made with source 10 turned off to provide a measurement of ambient or stray light entering 11, and can be initiated by operating manual pushbutton switch 22, thus connecting voltage from a suitable supply for the system via relay 24 and terminal E to ground. This activates relay 24 by turning on bistable multivibrator 23. As relay 24 operates, a momentary disconnection of ground occurs at break-before-make contacts 24F, 24G and 24H causing timing generator 50 to reset to a new zero time reference, whence a new timing cycle commences immediately, whereas cycles are normally initiated and timed in a regular manner by timing generator 50.

After 2.6 seconds in each new timing cycle gate 21 is opened by a voltage pulse generated in 50. Commencing at that time for an additional 48.5 seconds, pulses from the transmissometer detector 11 are applied through contacts 24C and 24E to background counter 20, when relay 24 is operated, and otherwise via 24D to counter 30. Since detector 11 measures total light received or light transmitted from all sources to the detector, it will be appreciated that counter 20 records total light received with light source 10 off, while counter 30 records total light received with light source 10 on minus the count on counter 20 as is hereinafter described. Note that activation of relay 24 also opens contacts 24A and 24B causing the transmissometer source lamp to be extinguished so that only stray light enters 11. Upon completion of the 48.5 second count period, gate 21 is closed by a pulse from timer 50. The trailing edge of the count period waveform is of a direction to reset bistable multivibrator 23, and relay 24 is deactivated. Contacts 24A and 24B reenergize the transmissometer source 10 and contacts 24C and 24D are closed to cause any future pulses from gate 21 to be passed to transmission counter 30.

As illustrated for this embodiment, timing generator 50 includes a timing base generator such as a crystal controlled oscillator operating at 100 kilocycles, which frequency is successively divided by two in a conventional manner, using 23 bistable multivibrators which, with suitable feedback modifications produce output pulses P through A of durations varying from .003 to 25.56 seconds as set out in the accompanying Table I.

TABLE 1.—TIMING GENERATOR OUTPUTS

| Output | t (ms.) | Frequency (kc.) |
| --- | --- | --- |
| A | 25,559.04 | |
| B | 12,779.52 | |
| C | 6,389.76 | |
| D | 3,194.88 | |
| E | 1,597.44 | |
| F | 798.72 | |
| G | 399.36 | |
| H | 199.68 | |
| I | 99.84 | |
| J | 49.92 | |
| K | 24.96 | |
| M | 12.48 | |
| N | 6.24 | |
| P | 3.12 | 160.256 |
| 8 | | 320.512 |
| 7 | | (1) |
| 6 | | (1) |
| 5 | | (1) |
| 4 | | (1) |
| 3 | | 6.25 |
| 2 | | 12.50 |
| 1 | | 25.00 |
| 0 | | 50.00 |
| Osc | | 100.00 |

[1] Not constant, feedback introduced.

Logical AND and OR circuit connections provide the various function waveforms shown in FIG. 2. All the waveforms there illustrated repeat regularly each 51.12 seconds unless a background count is initiated. In this event, the timing generator returns to a new zero time reference as relay 24 is activated as previously described, and the illustrated waveforms then commence again from the new time reference.

Once a background count has been completed and relay 24 deenergized, light source 10 is again activated to produce transmissivity measuring pulses from transmissometer detector 11 which are passed through gate 21, contacts 24C and 24D of relay 24 to transmission counter 30. The final count accrued after a 48.5 second counting time is proportional to atmospheric transmissivity plus background. Its value is transferred into transmission register 40 via gates 31 by application thereto of the transfer waveform 50r approximately 0.4 second after the final transmission count has been reached. Approximately 0.6 second after transfer, reset waveform 50s is applied to reset the transmission counter 30 so that a new transmissivity count can be obtained.

Register 40 receives and stores this transmissivity value, but in a form corrected for background light conditions. Note should be made that the reset pulse applied by timing generator 50 to transmission counter 30 does not reset that counter to zero but provides a gate signal to set counter 30 to a value stored on counter 20. Each bistable multivibrator stage which makes up the counter 30 is set to the complementary state of the corresponding counter state in the background counter 20. Complementing the state of a binary counter produces a number which is mathematically the 1's complement of that number. Adding the 1's complement of a number to another number is mathematically equivalent to one less than the difference of the two numbers expressed in binary rotation. In this way, the value last stored by operation of switch 22 in the background counter 20 representing ambient light, is subtracted from the value entered into the transmission counter 30 each time a new transmissivity count period is undertaken and the resultant difference value as registered in transmission counter 30 is independent of stray or ambient light effects, and it is this corrected value of transmissivity which is transferred to register 40 upon receipt at gates 31 of a transfer pulse (50r) from timing generator 50.

Tables 2–4 and 5–7 show the ranges of values that may appear in register 40 corresponding to each of 22 selectable RVR values that should be displayed. The three table columns correspond to three selectable runway light intensities during either day or night conditions.

TABLE 2-4.—RVR vs. TRANSMISSION REGISTER VALUE

[500 ft. baseline—night]

| Answer | RVR | L.S.5N | | L.S.4N | | L.S.3N | |
|---|---|---|---|---|---|---|---|
| 0 | 10– | 0 | 1 | 0 | 7 | 0 | 21 |
| 1 | 10 | 2 | 15 | 8 | 31 | 22 | 67 |
| 2 | 12 | 16 | 39 | 32 | 75 | 68 | 141 |
| 3 | 14 | 40 | 79 | 76 | 137 | 142 | 237 |
| 4 | 16 | 80 | 133 | 138 | 215 | 238 | 347 |
| 5 | 18 | 134 | 199 | 216 | 305 | 348 | 467 |
| 6 | 20 | 200 | 273 | 306 | 401 | 468 | 589 |
| 7 | 22 | 274 | 351 | 402 | 501 | 590 | 711 |
| 8 | 24 | 352 | 435 | 502 | 601 | 712 | 829 |
| 9 | 26 | 436 | 519 | 602 | 701 | 830 | 943 |
| 10 | 28 | 520 | 603 | 702 | 797 | 944 | 1,053 |
| 11 | 30 | 604 | 687 | 798 | 893 | 1,054 | 1,157 |
| 12 | 32 | 688 | 769 | 894 | 983 | 1,158 | 1,255 |
| 13 | 34 | 770 | 849 | 984 | 1,071 | 1,256 | 1,347 |
| 14 | 36 | 850 | 927 | 1,072 | 1,153 | 1,348 | 1,435 |
| 15 | 38 | 928 | 1,003 | 1,154 | 1,233 | 1,436 | 1,515 |
| 16 | 40 | 1,004 | 1,127 | 1,234 | 1,361 | 1,516 | 1,647 |
| 17 | 45 | 1,128 | 1,289 | 1,362 | 1,527 | 1,648 | 1,809 |
| 18 | 50 | 1,290 | 1,433 | 1,528 | 1,671 | 1,810 | 1,949 |
| 19 | 55 | 1,434 | 1,563 | 1,672 | 1,799 | 1,950 | 2,069 |
| 20 | 60 | 1,564 | 1,681 | 1,800 | 1,911 | 2,070 | 2,173 |
| 21 | 60+ | 1,682 | | 1,912 | | 2,174 | |

TABLE 5-7.—RVR vs. TRANSMISSION REGISTER VALUE

[500 ft. baseline—day]

| Answer | RVR | L.S.5D | | L.S.4D | | L.S.3D | |
|---|---|---|---|---|---|---|---|
| 0 | 10– | 0 | 125 | 0 | 307 | 0 | 643 |
| 1 | 10 | 126 | 271 | 308 | 565 | 644 | 863 |
| 2 | 12 | 272 | 451 | 566 | 841 | 864 | 1,059 |
| 3 | 14 | 452 | 647 | 842 | 1,107 | 1,060 | 1,229 |
| 4 | 16 | 648 | 841 | 1,108 | 1,353 | 1,230 | 1,377 |
| 5 | 18 | 842 | 1,029 | 1,354 | 1,505 | 1,378 | 1,505 |
| 6 | 20 | 1,030 | 1,203 | 1,506 | 1,619 | 1,506 | 1,619 |
| 7 | 22 | 1,204 | 1,365 | 1,620 | 1,719 | 1,620 | 1,719 |
| 8 | 24 | 1,366 | 1,511 | 1,720 | 1,809 | 1,720 | 1,809 |
| 9 | 26 | 1,512 | 1,645 | 1,810 | 1,889 | 1,810 | 1,889 |
| 10 | 28 | 1,646 | 1,767 | 1,890 | 1,959 | 1,890 | 1,959 |
| 11 | 30 | 1,768 | 1,877 | 1,960 | 2,025 | 1,960 | 2,025 |
| 12 | 32 | 1,878 | 1,977 | 2,026 | 2,083 | 2,026 | 2,083 |
| 13 | 34 | 1,978 | 2,069 | 2,084 | 2,135 | 2,084 | 2,135 |
| 14 | 36 | 2,070 | 2,151 | 2,136 | 2,183 | 2,136 | 2,183 |
| 15 | 38 | 2,152 | 2,225 | 2,184 | 2,229 | 2,184 | 2,229 |
| 16 | 40 | 2,226 | 2,297 | 2,230 | 2,297 | 2,230 | 2,297 |
| 17 | 45 | 2,298 | 2,381 | 2,298 | 2,381 | 2,298 | 2,381 |
| 18 | 50 | 2,382 | 2,453 | 2,382 | 2,453 | 2,382 | 2,453 |
| 19 | 55 | 2,454 | 2,511 | 2,454 | 2,511 | 2,454 | 2,511 |
| 20 | 60 | 2,512 | 2,563 | 2,512 | 2,563 | 2,512 | 2,563 |
| 21 | 60+ | 2,564 | | 2,564 | | 2,564 | |

In FIG. 1, blocks 71, 72, 73, 74, 75 and 76 represent logic for digital multichannel comparators. A separate comparator circuit is used for each of the six combinations of runway visual range shown in the columns under RVR and ambient conditions shown in the paired columns of digital counts representing the 22 groups of transmissivity measurements for each of the "L.S." designations, L.S. 5N, L.S. 4N, L.S. 3N, L.S. 5D, L.S. 4D and L.S. 3D. RVR table selector 60 constitutes suitable switch means for an enabling power supply which provides power to but one comparator circuit at a time so that even though inputs and outputs of 71 through 76 are in parallel, data is obtained from only one comparator circuit output.

Each of the six comparators 71 through 76, if activated by selector 60, divides the numbers which might appear in the transmissivity register 40 into 22 groups or channels of differing count distribution in the several comparators to provide always one of 22 possible answers, according to visibility under the differing ambient light and runway illumination represented in the six tables. Comparison of received input with stored tabular ranges of input may be by any appropriate scanning technique, not shown in detail. Each channel consists of logical AND and OR circuitry arranged according to the ranges in the table individual to the energized comparator so as to provide system output when, and only when, certain numbers are presented as an input from Gates 31 as indicated in Register 40. These certain numbers are, in each case, a range of values corresponding to one of the 22 answers for that particular table. In this way, any number in register 40 will cause one of twenty-two channels to have an output and the RVR answer will be thus established or selected for display.

Note that only the input count groupings are different in the six comparators, each comparator providing any one of the 22 possible answers from 1000– ft. to 6000+ ft. visibility according to its stored tabular range groups. Outputs obtained from any given channel of all comparators requires the same RVR value to be displayed, i.e., an output from channel 10 of any comparator causes an RVR value of 28 (hundreds of feet) to be displayed. Code translator 80 provides logic according to suitably selected known modes to change the 22 answer codes into corresponding RVR answers for display. Translation is accomplished simply in this embodiment by causing the comparator outputs to energize suitable relays having their contacts arranged to produce voltage at the proper inputs of the display device 90, being governed also by the timing generator to retain each correct display until the next correct measurement is registered, even though other counts have been made which cannot be displayed because of changes in the lighting factors and the stored tabular values to be compared.

Correct table selection and correct correlation of table readout with conditions under which the applicable transmissivity count was made is essential to error-free readout. It will be evident from the tables that a particular count received from the transmissometer during the transmissivity measurement interval can correspond to widely differing visual ranges depending on which light intensity switch is operated, as well as upon whether the measurement is made during the day or night hours. Each table (2-4, 5-7) shows all transmissivity count values for which each of 22 possible answers indicated as 0–21 under "Answer" column is correct. These answers correspond to visual ranges varying from less than 1000 feet (10–) to cover 6000 feet (60+) as listed under the "RVR" column. By way of example, note that the count of 768 in the "L.S.5N" column is within the range included in answer "12" corresponding to 3200 feet visual range. Under column "L.S.4N" it is noted that the count of 768 falls within answer "10" corresponding to 2800 feet visual range; in column "L.S.3N" the count of 768 lies within the range in answer "8" corresponding to 2400 feet visual range; in column "L.S.5D" it is found within answer "4" corresponding to 1600 feet, and is a value below safe landing visibility for a fast plane; in column "L.S.4D" the same count corresponds to answer "2" at 1200 feet visibility, and in "L.S.3D" is within the range of answer "1" corresponding to 1000 feet visibility, all of these possible answers being derived from the same transmissivity reading. Any automatic visibility computer and display unit should provide the correct interpretation of the count actually obtained by the transmissometer with due account being given to the applicable tabular values. It will be understood in the examples given that L.S.3, L.S.4, and L.S.5 refer to runway light intensity settings.

In addition, the present automatic system provides means for preventing the registry of a wrong answer, as might happen when the previously counted value, or portion thereof, prior to the changing of one of the switches controlling the light and the table selected according thereto, occurred where the light condition, for at least a part of the interval, was different from that at the end of the interval when the switches had been changed, and the enabled value to be read out was under control of the relay contacts according to the new condition. In the example hereinabove noted a corrected count of 768 pulses during the interval of measurement may represent dense fog under the conditions tabulated under L.S.3D or may represent a barely acceptable limit of visibility in answer "8" corresponding to L.S.3N, whereas conditions of L.S.5N provide a good margin of visibility representing 3200 feet corresponding to answer "12." In the foregoing illustration, the answer number is noted for purposes of understanding, but it will be appreciated that the display to the pilot will normally be expressed in terms of visual range in hundreds of feet at which the runway lights can be seen, being either 10—, 10, 12 . . . 60, or 60+. Since the counting interval approaches one minute (illustratively 48.5 seconds) a considerable time elapses and much distance is covered by a fast plane, during an interval in which a count has been made which cannot be correctly displayed because of a change of setting during the counting interval.

Practical considerations require that an automatic RVR computer and dislay system avoid displaying wrong answers or failure to display any answer for an interval approaching the whole counting period. In accordance with this invention, the last measurement completed remains displayed until a new count is completed for storage in the register, since no new channel comparator output is taken if an interruption of circuit occurs during a count period. If the LS switch or the day-night switch is changed during a measurement interval, the count for that interval is thus not displayed in the readout either by disabling the transfer from register 30 or the code translation, or failing to energize one of the comparator channels. Conveniently, the timing generator may be reset to zero to start a new timing cycle by breaking the appropriate holding circuit, as when a new switching signal is received. Under this condition, the previous count remains displayed in its decoded RVR form until the end of the next counting cycle when a new count is established.

It will be appreciated that the functions described may be made effective by a variety of circuitry known in the computing and automatic data processing arts so that the illustrated circuitry is by block diagram rather than detailed wiring diagram. By way of example, a storage register may consist of 11 flip-flop circuits relay-connected in a suitable logic arrangement for storing counts up to 4095. Readout and storage may be in the hexadecimal or other code system for binary storage, and display may be relay-selected or by electronic equivalents.

Various means may be provided to indicate light intensity employed for the runway lights and to determine and feed into the computer information concerning whether the day-time or the night-time light condition obtains. For example, the LS3, LS4 and LS5 positions may be remotely determined by transmitting from the locality of the light control switch signals of differing frequency corresponding to the respective standard intensities of illumination. When one of these frequencies is received and passed through suitable filtering an actuate signal operates relays suitable for connecting output from one of the multichannel comparators to the code translator. Similarly, the day or night conditions may be measured, for example by local photocell, and this information also fed into a suitable logic circuit for selecting the appropriate table to be employed with the instantly indicated light setting for reading out the computation of visual range on the correct one of the comparators corresponding to the stored value in the transmission register. The runway light intensity is indicated generally in FIG. 1 as an input to RVR table selector 60 and the day-night indication as a second input thereto. Table selector 60 provides an output to one or another of comparators 71–76, each of which are connected at all times to the transmission register, but only one of which is enabled to pass along a range value corresponding to that count transferred from the transmission register and therein compared by suitable logic circuitry to provide the appropriate answer indicating visual range. Code translator 80 is generally indicated as conventional means for converting the output from a comparator (a binary number) which is actuated according to selector 60 to provide one of 22 coded values of visual range as above-noted to be displayed on device 90.

Preferably, the display device consists of three digits in which the first two digits represent the first significant figures of visual range determined in comparators 71–76 one being enabled by a signal from selector 60. The first and second digits register visibility, the first in thousands and the second in hundreds of feet visual range, as found under the RVR column of Tables 2–4 and 5–7. The third digit of the display may be a minus sign to indicate that the range is less than 1000 feet, or a plus sign to indicate that the range is greater than 6000 feet. If a test is in operation, the third digit of the display is caused to indicate "T" to inform the pilot that any numbers displayed in the first and second digits do not represent visual range. Similarly, when the light condition does not correspond to LS3, LS4, or LS5 values of runway intensity there is no output selected from any of the comparators 71–76 and an "L" appears in the third digit of the display device. Various suitable arrangements may be made for differing displays for the differing conditions of test and transition from one test to another, of which that described is a suitably arranged embodiment found acceptable in practice.

While switching is variously illustrated as by relay and by flip-flop or bistable multivibrator, it will be appreciated that switching may be of either kind, and that storage of numbers may be in binary or other form suitable for automatic storage and comparison. Storage may be in the hexadecimal form to minimize on electrical connections or in conventional binary form, and could be accomplished by core storage or in flip-flop circuits suitable for assembly in integrated circuit form. Other modifications and variations are of course possible without departing from the invention within the scope of the claims.

What is claimed is:
1. A system for determining visual range along a path, comprising
 a light source directed along said path,
 light detection means disposed in said path for providing pulses in proportion to received light intensity,
 timing signal generator means having an output marking repeatable counting intervals,
 first counting means for said pulses occurring in successive said intervals while said source is operative,
 second counting means connectable to said detection means while said source is not operative for indicating background light, switch means for simultaneously operating said light source and said first counting means which indicates total light received by the detection means when said light source is operative; and for connecting said second counting means to said detector means during periods when said light source is not operative to indicate background light, count registering means for registering counts accumulated during said periods, means effective upon marking the termination of each period in which the said second counting means is connected to the detection means for storing in said registering means a background count, means effective upon marking the termination of succeeding periods when said source is operative for registering counts representative of total light received by the light detection means minus background light counts, table storage means representative of predetermined relationships between counts registered and visual range along said path, comparator means for comparing said registered counts with tabular values in said table storage means to indicate visual range according to the tabular relationship, and indicator means connected responsively to said comparator means for indicating visual range according to said tabular value relationship.

2. A system according to claim 1, said means for registering counts representative of total light received by the detection means minus background light counts comprising binary register means settable to the 1's complement of the count on said second counting means, and means effective to reset said registering means to said 1's complement setting before registration of counts made in successive periods in said first counting means.

3. A system according to claim 1, including plural table storage means representing visual ranges for received light under predetermined lighting conditions connected to said means for comparing registered counts, and means for selecting one of said storage means for comparison of registered counts to tabular values corresponding to one said lighting condition.

4. Apparatus for indicating visual range along a path, comprising:
photocell detecting means directed along said path,
means converting output of said detecting means into a series of pulses of frequency proportioned to the light intensity detected,
first and second counting means alternatively connectable to indicate counts of said pulses occurring within successive predtermined time intervals,
time signal generating means having an output operative to control said time intervals during which countting occurs,
a source of light directed along said path toward said detecting means,
switch means for energizing said light source during successive intervals of counting by said first counting means and for deenergizing said light source while connecting said second counting means to said detecting means to separately accumulate counts for total light and background light,
means registering a background count of one said interval in opposition to a count representing total light and for registering a difference therebetween,
a table storage means relating tabular values of said difference count to a visual range figure,
comparator means for determining a stored tabular value approximating said count register, and
display means for indicating a result of said comparison.

5. Visual range indicating apparatus according to claim 4, including plural table storage means representing a plurality of predetermined relationships between difference count and tabular values according to predetermined sets of lighting conditions along said path, and switching means for effectively connecting a selected one of said storage means for comparison with registered counts.

6. Apparatus according to claim 4, including a plurality of sets of tabular values stored in a plurality of tabular storage means for differing conditions of illumination along said path, and means operatively connecting one said table storage means at a time to said comparator means for comparison therein with the instantaly registered difference count according a said condition of illumination.

7. Computer apparatus for determining visual range according to predetermined relationships between visual range and light transmitted along a path for a plurality of lighting conditions expressed in tabular form, comprising:
a table storage means storing indicia of said relationships for each of said conditions including a range value corresponding to each of a number of light transmission values detectable along an observation path,
switch means for selecting for said comparison one said table of indicia in accordance with a said lighting condition along said path,
means comparing a digitial figure corresponding to a measured light value with said stored indicia of one said storage means,
a light source directed along said path,
timing signal generating means for establishing in succession like periods of measurement of light,
light measuring means in said path having a digital output,
first counting means responsive to said output and said timing signal means for accumulating a count during selected said periods,
second counting means responsively connectable to said measuring means for accumulating a count during other said periods,
switch means turning on and off said light source while connecting one said counting means to the measuring means when said source is off and for connecting said second counting means to the measuring means when said light is on, whereby background light is measured as a count during one period and transmitted light is measured during other periods, and
means registering counts representing said background light and said transmitted light in opposition one to the other for subtracting background count from transmitted light counts, the difference therebetween being coupled to said comparator means for providing a visual range output in accordance with a tabular range value for light received corresponding to the selected table for said lighting condition.

8. An indicator system for measuring and displaying visual range along a path, comprising:
light projection means directed along said path,
photocell detection means diposed in said path to measure light intensity therein having an output of pulses at a rate proportional to the detected light intensity,
timing signal means marking successive like periods of light detection,
switch means operative to turn said light source on or off during selectable periods of measurement established by said timing signal means,
first digital counting means for registering pulses from said photocell means during a said period when said light source is not operative,
second digital counter means for registering pulses from said photocell means during successive said periods when said light source is operative, switching means effective to operate said light source and to connect said second counter means to said photocell means during successive said periods and for extinguishing said light source while connecting said photocell means to said first counter means, count registering means for effectively subtracting from said counts as registered during said successive periods a registration of a previously accumulated count during a period of light extinction, means for storing a plurality of sets of tabular values of relationships between registered counts and visual range along said path for a plurality of predetermined lighting conditions, means selecting said sets of tabular values one at a time for comparison with a registered count, means comparing the instantly registered count with the selected set of said stored values to provide an output indicating a tabular relationship of the remainder count to a visual range, and indicator means connected to said comparing means for indicating said range.

9. In a system according to claim 8, said count registering means including means for resetting the registered remainder at the beginning of each successive period of measurement.

10. In a system according to claim 8, said timing signal means being connected to cause said count registering means to be reset, said count registering means including means for registering background light counts made during an interval of light extinction as a negative registration to which successive counts made during light projection along the path are added.

References Cited

UNITED STATES PATENTS

| | | | |
|---|---|---|---|
| 2,991,365 | 7/1961 | Churchill. | |
| 3,174,045 | 3/1965 | Whitney et al. | 250—203 X |
| 3,204,221 | 8/1965 | Sierra | 235—177 X |
| 3,230,379 | 1/1966 | Aroyan et al. | 250—203 X |
| 3,290,648 | 12/1966 | Smeltzer | 235—177 X |
| 3,299,769 | 1/1967 | Byers. | |
| 3,350,033 | 10/1967 | Goldberg | 250—203 X |

JEWELL H. PEDERSEN, *Primary Examiner.*
W. A. SKLAR, *Assistant Examiner.*

U.S. Cl. X.R.

250—203, 219; 340—149; 235—177, 92